Figure 1:
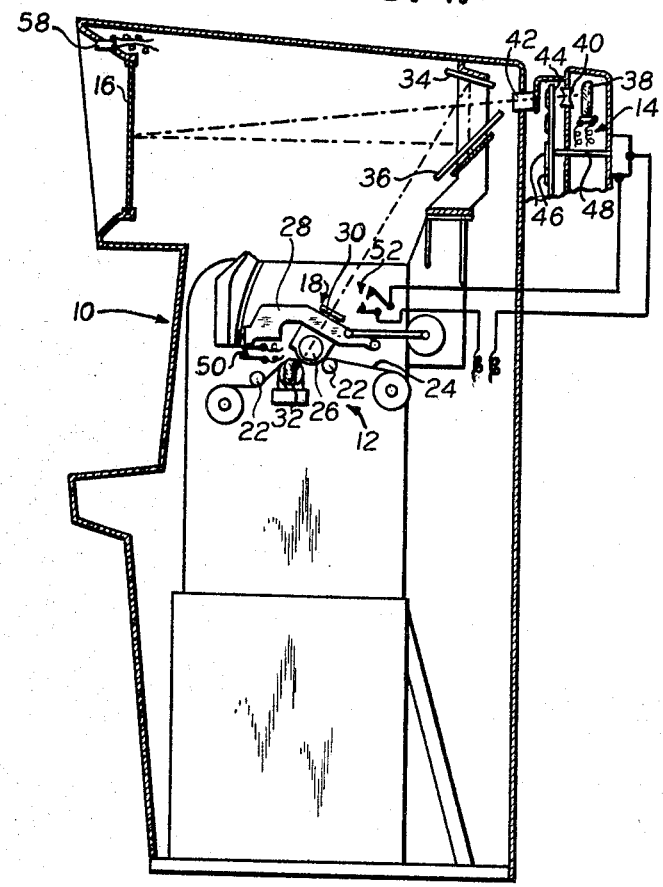

Nov. 1, 1966  A. BOTTANI  3,282,151

PROJECTION APPARATUS

Filed Feb. 12, 1964

INVENTOR
ANGELO BOTTANI
BY Hubbell, Cohen &
Stiefel

ATTORNEYS.

3,282,151
PROJECTION APPARATUS
Angelo Bottani, Milan, Italy, assignor to Societa Internazionale Fonovisione S.p.A., Milan, Italy, a corporation of Italy
Filed Feb. 12, 1964, Ser. No. 344,378
Claims priority, application Italy, Feb. 27, 1963, 3,919/63
10 Claims. (Cl. 88—24)

This invention relates to projection apparatus and particularly to apparatus for projecting motion picture films onto an incorporated screen, which apparatus is preferably coin controlled.

It is known that the visual effect of images projected on a screen is optimum when the brightness of the screen due to the projection of the image is in a predetermined ratio to the brightness of the ambient illumination surrounding the screen. In normal projection devices, such as are encountered in motion picture theaters, the conditions of the ambient light are predetermined and relatively constant. Hence the intensity of the projected image can be predetermined for optimum viewing and once so determined need not be varied. However, in devices which project images on a screen in ordinary rooms, the illumination of such rooms is not predeterminable nor is it necessarily unvarying. Accordingly, in the producing a device for film projection within a variety of different types of rooms, it is difficult to preset the intensity of the illumination of the screen so that it will be in optimum relationship with the ambient light intensity.

It is therefore one object of the present invention to provide a projection apparatus wherein the intensity of the image being projected varies in accordance with ambient light.

Still another object of the present invention is the provision of a projection apparatus having an integral screen and two projecting devices, a film projector and a slide projector, which operate in the alternative, and means for controlling both the film projector and the slide projector to vary the intensity of the projection thereof in accordance with the intensity of the ambient light surrounding the screen.

The above and other objects, characteristics and features of the present invention will be more fully understood from the following description taken in connection with the accompanying illustrative drawing.

Figure 2:
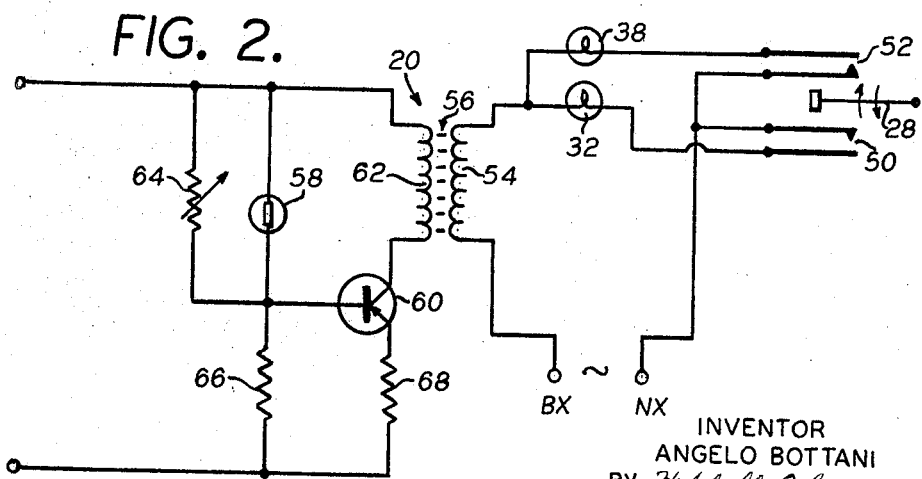

In the drawing:

FIG. 1 is a vertical sectional view of a projection apparatus embodying the present invention; and FIG. 2 is a diagrammatic view of the electrical circuitry embodying the present invention.

Referring now to the drawing in detail, the projection apparatus embodying the present invention is generally designated by the reference numeral 10 and includes a film projector 12, a slide projector 14, both of which are adapted to project images on a screen 16. The two projectors 12 and 14 are interlocked by a suitable interlocking means 18 which is adapted to selectively energize one or the other of the projectors. In addition, there is light intensity control apparatus generally designated by the reference numeral 20.

The combination of the film projector 12, the slide projector 14, the screen 16 and the interlocking means 18 is described and claimed in detail in my companion application for Combined Film and Slide Projector filed by me concurrently with the present application and assigned to the assignee hereof. Accordingly, if a detailed description of the apparatus is desired, reference may be had to said copending application. Suffice it to say for an understanding of the present invention, the film projector 12 includes sprocket means 22 for feeding film 24 around a transparent pressure roller 26 carried by a movable arm 28 which forms a part of the interlocking means. Carried by the arm 28 is a lens 30 which directs the light emanating from the lamp 32 to a first mirror 34 and a second mirror 36, which mirrors are arranged to ultimately reflect the light onto the screen 16.

The slide projector includes a lamp 38, a condensing lens 40, and an objective lens 42, both of which lenses are arranged to focus an image on the screen 16. The slide projector 14 also includes a slide holder 44 adapted to movably support a plurality of slides 46 and to bring those slides selectively into and out of registry with the lenses 40 and 42. More particularly, as may be best understood from reference to my copending application above identified, the slide holder 44 is intermittently rotated about its shaft 48 so as to periodically change the slide 46 being illuminated by the slide projector lamp 38. Specifically, a Geneva drive movement (not shown) may be employed for effecting the intermittent movement of the slide holder.

The interlocking means 18 is adapted to energize one or the other of the two projectors so that the screen 16 is never long without an image illuminated thereon. That is to say, the interlocking means is adapted to at times, perhaps upon coin actuation, actuate the film projector 12 and thus cause a motion picture to be projected on the screen 16. At the conclusion of the projection of the film on the screen 16 the interlocking apparatus will operate to deenergize the film projector 12 and to energize the slide projector 14 to project either pictures or advertisements or notices or the like onto the screen in between the showing of films.

As already noted the interlocking means includes a pivotally movable arm 28 which in its lower position (as shown in FIG. 1) engages and closes a normally open switch 50 to energize the film projector 12. When the arm 28 is pivoted to an upward position it will operatively engage normally open switch 52 to close that switch and thereby energize the slide projector 14. As may be seen in the circuit diagram of FIG. 2, the lamp 32 of the film projector 12 is energized by a circuit which may be traced from the terminal BX of a suitable power source, through the main winding of a saturable core reactor 56, the purpose of which will be understood hereinafter, through the lamp 32, through the switch 50 to the terminal NX of the power source. Thus, when the normally open switch 50 is closed by a downward movement of the arm 28 in the interlocking means 18, the film projector lamp 32 will be lighted. The slide projector lamp 38 is energized over a circuit which may be traced from the terminal BX, through the winding 54 of the saturable core reactor 56 through the lamp 38, through the switch 52, to the terminal NX of the power source. Thus when the normally open switch 52 is closed by an upward movement of the arm 28 in the interlocking mechanism 18, the slide projector lamp 38 will be energized and illuminated.

In accordance with the present invention means are provided for varying the voltage across the lamps 32 and 38 (whichever is energized) to vary the intensity of the light emanating from said lamps in accordance with the intensity of the ambient light surrounding the screen 16. This is accomplished by means of the saturable core reactor 56 and apparatus associated therewith. Particularly, a light responsive device, here shown as a photoresistor 58, is disposed adjacent the screen 18 so that it is exposed to substantially the same ambient light as the screen. The photoresistor 58 is preferably shielded from the screen in order to avoid direct illumination of the photoresistor by the screen itself. The physical position of the photoresistor 58 may be seen in FIG. 1. The photoresistor is associated with an amplifier, here shown as a transistor 60, the output of which is supplied to the control winding 62 of the saturable core reactor 56. It is known that as the current through the control winding 62 increases to saturate the core of the reactor 56, the reactance of the main winding 54 will decrease whereby to increase the voltage across the lamp 32 or the lamp 38 depending upon which is energized by the position of the arm 28 of interlocking means 18. The control of the current through the control windings 62 as already noted is effected by the photoresistor 58 and the amplifier 60. Specifically, as the intensity of the ambient light impinging on the photoresistor 58 increases, the resistance of the photoresistor will increase in a relatively linear relationship. As the resistance of the photoresistor 58 decreases, the current flowing through the control winding 62 will increase, to thereby increase the saturation of the reactor 56. This increase in saturation will decrease the reactance of the winding 54 to thus increase the voltage on either one or the other of the lamps 32 or 38 to thus increase the intensity of the image being projected onto the screen 16 to maintain the level of illumination on the screen in a relatively constant relationship with the now increased ambient light. Naturally, if the value of the ambient light impinging on the photoresistor were to decrease, the resistance of the photoresistor would increase to thereby cause a decrease in the output of the amplifier 60 and hence a decrease in the current flowing through the control winding 62 of the saturable core reactor 56. This in turn would decrease the amount of saturation in reactor 56 and hence increase the reactance in the winding 54 to decrease the voltage across the illuminated lamp 32 or 38. Again, this would maintain a relatively constant relationship between the light on the screen 16 from the illuminating lamp 32 or 38 and the ambient light surrounding the screen. It will be obvious to those skilled in the art that the variable resistor 64 provides an adjustable bias voltage for transistor amplifier 60 while the resistors 66 and 68 act as stabilizing resistors.

While in the foregoing description the control apparatus 20 has been shown and described as controlling the voltage applied to the illuminating lamp of one of the two projectors, as is presently preferred, a similar system can be employed in connection with other means for varying the intensity of light being projected onto the screen 16. For example, the output of the amplifier 60 could be employed to energize a motor means which opens and closes a variable diaphragm through which the screen illuminating light passes without departing from the scope of this invention. In the alternative the output of the amplifier 60 could be supplied to a motor means for varying the orientation of crossed polarizing elements to thereby vary light intensity. As an additional modification, the output of the amplifier 60 could be employed to selectively move screens of varying transparency into the light beam being directed onto the screen from one of the projectors. Other means of varying light intensity in accordance with variations in ambient light adjacent the screen will become obvious to persons skilled in the art.

While the present control apparatus has been shown and described in connection with a double projector apparatus, it will be understood that it will operate just as satisfactorily if only one form of projector were included. Also, photo responsive means other than a photoresistor may be employed for varying the intensity of the illumination on the screen in accordance with ambient light.

While I have herein shown and described the preferred form of the present invention and have suggested modifications therein, other changes and modifications may be made therein within the scope of the appended claims without departing from the spirit and scope of this invention.

What I claim is:

1. An image projection apparatus comprising a lamp, a screen, means for directing light from said lamp to said screen, means responsive substantially solely to the ambient light adjacent said screen, and means responsive to said ambient light responsive means for varying the intensity of the light from said lamp impinging on said screen in accordance with said ambient light.

2. An image projection apparatus comprising an electric lamp, circuit means for energizing said lamp, a screen, means for directing light from said lamp to said screen, means responsive substantially solely to the ambient light adjacent said screen, and means responsive to said ambient light responsive means for varying the voltage applied to said lamp in accordance with said ambient light, whereby to vary the brightness of said bulb.

3. Image projection apparatus comprising a screen, an electric lamp for illuminating said screen, a saturable core reactor having a main winding and a control winding, and circuit means for energizing said lamp including said main winding of said saturable core reactor, means responsive substantially solely to the ambient light adjacent said screen, and circuit means for energizing the control winding of said saturable core reactor controlled by said ambient light responsive means.

4. Image projection apparatus comprising a screen, an electric lamp for illuminating said screen, a saturable core reactor having a main winding and a control winding, and circuit means for energizing said lamp including said main winding of said saturable core reactor, a photoresistor disposed adjacent said screen for responding substantially solely to the ambient light adjacent said screen, circuit means for energizing said control winding of said saturable core reactor controlled by said photoresistor so that as the ambient light adjacent said screen increases, the current through said control winding will increase.

5. Image projection apparatus comprising a screen, an electric lamp for illuminating said screen, a saturable core reactor having a main winding and a control winding, and circuit means for energizing said lamp including said main winding of said saturable core reactor, in series with said lamp, a photoresistor disposed adjacent said screen for responding substantially solely to the ambient light adjacent said screen, an amplifier having its output connected to said control winding of said saturable core reactor, and an input circuit for said amplifier controlled by said photoresistor.

6. Image projection apparatus comprising a screen, a film projector including a first lamp for projecting a filmed image on said screen, a slide projector including a second lamp for projecting an image on said screen, interlocking means for actuating in the alternative said film and said slide projector, means responsive substantially solely to the ambient light adjacent said screen, and means responsive to said ambient light responsive means for varying the intensity of the image projected onto said screen.

7. Image projection apparatus comprising a screen, a film projector including a first electric lamp for projecting a filmed image on said screen, a slide projector including a second electric lamp for projecting an image on said screen, interlocking means for actuating in the alternative said film and said slide projector, means responsive substantially solely to the ambient light adjacent said screen, and means responsive to said ambient light responsive means for varying the intensity of the image projected onto said screen, interlocking means including first and second normally open switch means associated with said first and second lamps, respectively, and means for alternatively closing said first and second switch means, means responsive to the ambient light adjacent said screen, circuit means for energizing said first and second lamps including said first and second switch means, and means for varying the voltage applied to said first and second lamps by said circuit means controlled by said ambient light responsive means.

8. Image projection apparatus comprising a screen, a film projector including a first electric lamp for projecting a filmed image on said screen, a slide projector including a second electric lamp for projecting an image on said screen, interlocking means including first and second normally open switch means associated with said first and second lamps, respectively, and a member movable to and from a first position in which it operatively engages and closes said first switch means and from and to a second position in which it operatively engages and closes said second switch means, a saturable core reactor having a main and a control winding, circuit means for energizing said first lamp including said main winding of said saturable core reactor and said first switch, circuit means for energizing said second lamp including said main winding of said saturable core reactor and said second switch means, means responsive substantially solely to the ambient light adjacent said screen, and circuit means for energizing the control winding said saturable core reactor, said last mentioned circuit means being controlled by said ambient light responsive means.

9. Image projection apparatus comprising a screen, a film projector including a first electric lamp for projecting a filmed image on said screen, a slide projector including a second electric lamp for projecting an image on said screen, interlocking means including first and second normally open switch means associated with said first and second lamps, respectively, and a member movable to and from a first position in which it operatively engages and closes said first switch means and from and to a second position in which it operatively engages and closes said second switch means, a saturable core reactor having a main and a control winding, circuit means for energizing said first lamp including said main winding of said saturable core reactor and said first switch, circuit means for energizing said second lamp including said main winding of said saturable core reactor and said second switch means, means responsive substantially solely to the ambient light adjacent said screen, an amplifier having an input and an output, circuit means connecting said amplifier output to said control winding of said saturable core reactor, and circuit means connecting said amplifier input to said ambient light responsive means.

10. Image projection apparatus as defined in claim 9, wherein said ambient light responsive means is a photoresistor.

References Cited by the Examiner
UNITED STATES PATENTS

| | | | |
|---|---|---|---|
| 947,490 | 1/1910 | Gwozdz | 352—198 |
| 2,607,266 | 8/1952 | Rabinowitz | 88—24 |
| 2,978,954 | 4/1961 | Watson | 88—24 |
| 3,056,332 | 10/1962 | Beregowitz | 88—24 |
| 3,076,378 | 2/1963 | Biedermann et al. | 88—24 |

NORTON ANSHER, *Primary Examiner.*
HAROLD H. FLANDERS, *Assistant Examiner.*